(12) United States Patent
Davis et al.

(10) Patent No.: US 8,904,209 B2
(45) Date of Patent: Dec. 2, 2014

(54) ESTIMATING AND MANAGING POWER CONSUMPTION OF COMPUTING DEVICES USING POWER MODELS

(75) Inventors: John D. Davis, San Francisco, CA (US); Moises Goldszmidt, Palo Alto, CA (US); Suzanne M. Rivoire, Daly City, CA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 13/295,112

(22) Filed: Nov. 14, 2011

(65) Prior Publication Data

US 2013/0124885 A1  May 16, 2013

(51) Int. Cl.
- G06F 1/26 (2006.01)
- G06F 1/28 (2006.01)
- G06F 1/32 (2006.01)

(52) U.S. Cl.
CPC .............. G06F 1/3206 (2013.01); G06F 1/324 (2013.01); G06F 1/325 (2013.01); G06F 1/3296 (2013.01)
USPC ........... 713/320; 713/300; 713/310; 713/330; 713/340; 709/220; 709/221

(58) Field of Classification Search
USPC .......... 713/320, 300, 310, 330, 340; 709/220, 709/221
See application file for complete search history.

(56) References Cited

U.S. PATENT DOCUMENTS

| | | | | |
|---|---|---|---|---|
| 5,781,783 | A * | 7/1998 | Gunther et al. ............... | 713/320 |
| 6,564,332 | B1 * | 5/2003 | Nguyen et al. ................ | 713/340 |
| 7,421,599 | B2 * | 9/2008 | Bahali et al. .................. | 713/320 |
| 7,444,526 | B2 * | 10/2008 | Felter et al. ................... | 713/300 |
| 7,467,311 | B2 * | 12/2008 | Bahali et al. .................. | 713/320 |
| 7,502,948 | B2 * | 3/2009 | Rotem et al. .................. | 713/300 |
| 7,581,125 | B2 * | 8/2009 | Ranganathan et al. ....... | 713/320 |
| 7,617,406 | B2 * | 11/2009 | Yasuo ........................... | 713/320 |
| 7,647,516 | B2 * | 1/2010 | Ranganathan et al. ....... | 713/320 |
| 7,793,126 | B2 * | 9/2010 | McGrane et al. ............. | 713/320 |
| 7,877,620 | B2 * | 1/2011 | Gara et al. .................... | 713/320 |
| 8,001,403 | B2 * | 8/2011 | Hamilton et al. ............. | 713/320 |
| 8,015,423 | B1 * | 9/2011 | Satterfield et al. ............ | 713/322 |
| 8,028,179 | B2 * | 9/2011 | Zettler .......................... | 713/320 |

(Continued)

OTHER PUBLICATIONS

"Data Center Energy Efficiency with Intel® Power Management Technologies", Retrieved at <<http://software.intel.com/sites/datacentermanager/power_mgmt_tech.pdf>>, Feb. 2010, pp. 4.

(Continued)

Primary Examiner — Ryan Stiglic
(74) Attorney, Agent, or Firm — Micah Goldsmith; Leonard Smith; Micky Minhas

(57) ABSTRACT

Power consumption of computing devices are monitored with performance counters and used to generate a power model for each computing device. The power models are used to estimate the power consumption of each computing device based on the performance counters. Each computing device is assigned a power cap, and a software-based power control at each computing device monitors the performance counters, estimates the power consumption using the performance counters and the model, and compares the estimated power consumption with the power cap. Depending on whether the estimated power consumption violates the power cap, the power control may transition the computing device to a lower power state to prevent a violation of the power cap or a higher power state if the computing device is below the power cap.

20 Claims, 8 Drawing Sheets

(56) References Cited

U.S. PATENT DOCUMENTS

| | | | |
|---|---|---|---|
| 8,108,703 B2* | 1/2012 | Bahali et al. | 713/320 |
| 8,140,868 B2* | 3/2012 | Felter et al. | 713/300 |
| 8,190,939 B2* | 5/2012 | Fields et al. | 713/324 |
| 8,225,119 B2* | 7/2012 | Jain et al. | 713/320 |
| 8,458,116 B2* | 6/2013 | Lupetini | 706/54 |
| 8,504,861 B2* | 8/2013 | Sawai et al. | 713/340 |
| 2004/0163001 A1* | 8/2004 | Bodas | 713/300 |
| 2005/0138438 A1* | 6/2005 | Bodas | 713/300 |
| 2006/0184287 A1* | 8/2006 | Belady et al. | 700/291 |
| 2006/0288241 A1* | 12/2006 | Felter et al. | 713/300 |
| 2007/0005994 A1* | 1/2007 | Bahali et al. | 713/300 |
| 2007/0049133 A1* | 3/2007 | Conroy et al. | 439/894 |
| 2007/0050644 A1* | 3/2007 | Merkin | 713/300 |
| 2007/0186121 A1* | 8/2007 | Yasuo | 713/320 |
| 2008/0301475 A1* | 12/2008 | Felter et al. | 713/300 |
| 2009/0235097 A1* | 9/2009 | Hamilton et al. | 713/320 |
| 2009/0265564 A1 | 10/2009 | Clemo et al. | |
| 2010/0218005 A1* | 8/2010 | Jain et al. | 713/300 |
| 2010/0296238 A1* | 11/2010 | Mowry et al. | 361/679.53 |
| 2010/0332876 A1* | 12/2010 | Fields et al. | 713/323 |
| 2011/0016337 A1* | 1/2011 | Cepulis | 713/320 |
| 2011/0106286 A1* | 5/2011 | Lupetini | 700/103 |

OTHER PUBLICATIONS

"IBM Systems Director Active Energy Manager for Power Systems", Retrieved at <<http://www-01.ibm.com/common/ssi/rep_ca/5/872/ENUSAP08-0275/ENUSAP08-0275.PDF>>, Nov. 11, 2008, pp. 15.

Femal, et al., "Boosting Data Center Performance Through Non-Uniform Power Allocation", Retrieved at <<http://ieeexplore.ieee.org/stamp/stamp.jsp?tp=&arnumber=1498069>>, Proceedings: Second International Conference on Autonomic Computing, Jun. 13-16, 2005, pp. 250-261.

Khargharia, et al., "Autonomic Power & Performance Management for Large-Scale Data Centers", Retrieved at <<http://ieeexplore.ieee.org/stamp/stamp.jsp?tp=&arnumber=4228238>>, IEEE International Parallel and Distributed Processing Symposium, Mar. 26-30, 2007, pp. 1-8.

John, et al., "Dell Energy Smart Architecture (DESA) for 11G Rack and Tower Servers", Retrieved at <<http://www.dell.com/downloads/global/products/pedge/en/poweredge-11g-desa-white-paper.pdf>>, Retrieved Date: Aug. 16, 2011, pp. 44.

Andersen, et al., "FAWN: A Fast Array of Wimpy Nodes", Retrieved at <<http://www.cs.cornell.edu/courses/cs6460/2011sp/papers/fawn-sosp09.pdf>>, SOSP, Oct. 11-14, 2009, pp. 1-17.

Chen, et al., "Managing Server Energy and Operational Costs in Hosting Centers", Retrieved at <<http://cse.unl.edu/~lwang/project/managing%20sever%20energy%20and%20operational%20costs%20in%20hosting%20center.pdf>>, SIGMETRICS, Jun. 6-10, 2005, pp. 303-314.

Choi, et al., "Profiling, Prediction, and Capping of Power Consumption in Consolidated Environments", Retrieved at <<http://ieeexplore.ieee.org/stamp/stamp.jsp?tp=&arnumber=4770558>>, IEEE International Symposium on Modeling, Analysis and Simulation of Computers and Telecommunication Systems, Sep. 8-10, 2008, pp. 10.

"Clueweb09 Dataset", Retrieved at <<http://boston.lti.cs.cmu.edu/Data/clueweb09/ >>, Retrieved Date: Aug. 6, 2011, pp. 6.

Cretu-Ciocarlie, et al., "Hunting for Problems with Artemis", Retrieved at <<http://citeseer.ist.psu.edu/viewdoc/download;jsessionid=B8DB76344336F0CE0AAA4A79B850C60B?doi=10.1.1.144.3611&rep=rep1&type=pdf>>, Proceedings of the First USENIX conference on Analysis of system logs, 2008, pp. 8.

Davis, et al., "Accounting for Variability in Large-scale Cluster Power Models", Retrieved at <<http://research.microsoft.com/pubs/146087/EXERT_Variability_CR3.pdf>>, 2nd Workshop on Exascale Evaluation and Research Techniques, Held in Conjunction with ASPLOS, 2011, pp. 6.

Davis, et al., "No Hardware Required: Building and Validating Composable Highly Accurate Os-based Power Models", Retrieved at <<http://research.microsoft.com/pubs/152100/HotPower_TR_V1.0.pdf>>, Technical Report—MSR-TR-2011-89, Jul. 2011, pp. 5.

Dean, et al., "MapReduce: Simplified Data Processing on Large Clusters", Retrieved at <<http://students.mimuw.edu.pl/SR-MSUI/03-MapReduce/mapreduce-osdi04.pdf>>, In Proceedings of OSDI, 2004, pp. 137-150.

Deng, et al., "MemScale: Active Low-power Modes for Main Memory", Retrieved at <<http://www.research.rutgers.edu/~luramos/pdf/asplos11memscale.pdf>>, ASPLOS, Mar. 5-11, 2011, pp. 14.

Efron, et al., "Least Angle Regression", Retrieved at <<http://171.64.102.103/~imj/WEBLIST/2004/LarsAnnStat04.pdf>>, The Annals of Statistics, 2004, vol. 32, No. 2, pp. 407-499.

Fan, et al., "Power Provisioning for a Warehouse-sized Computer", Retrieved at <<http://research.google.com/archive/power_provisioning.pdf>>, In Proceedings of the ACM International Symposium on Computer Architecture, Jun. 9-13, 2007, pp. 11.

Friedman, Jerome H., "Multivariate Adaptive Regression Splines", Retrieved at <<http://www.ms.unimelb.edu.au/~odj/Teaching/dm/Friedman91_MARS.pdf>>, The Annals of Statistics, vol. 19, No. 1, 1991, pp. 1-67.

Gandhi, et al., "Optimal Power Allocation in Server Farms", Retrieved at <<http://www.cs.zju.edu.cn/people/yedeshi/seminar09/Sigmetrics09power.pdf>>, SIGMETRICS/Performance, Jun. 15-19, 2009, pp. 14.

Govindan, et al., "Statistical Profiling-based Techniques for Effective Power Provisioning in Data Centers", Retrieved at <<http://www.csd.uwo.ca/courses/CS9842/papers/euro220-govindan.pdf>>, EuroSys, Apr. 1-3, 2009, pp. 14.

"Annual Fully Burdened Cost of Power", Retrieved at <<http://perspectives.mvdirona.com/2008/12/06/AnnualFullyBurdenedCostOfPower.aspx>>, Dec. 6, 2008, pp. 5.

Hamilton, James., "Cooperative Expendable Micro-Slice Servers (CEMS): Low-cost, Low-power Servers for Internet-scale Services", Retrieved at <<http://citeseerx.ist.psu.edu/viewdoc/download?doi=10.1.1.145.1407&rep=rep1&type=pdf>>, 4th Biennial Conference on Innovative Data Systems Research (CIDR), Jan. 4-7, 2009, pp. 1-8.

"HP Power Capping and HP Dynamic Power Capping for ProLiant servers", Retrieved at <<http://h20000.www2.hp.com/bc/docs/support/SupportManual/c01549455/c01549455.pdf>>, HP Technical Report TC090303TB, 2009, pp. 25.

Hoffmann, et al., "Dynamic Knobs for Responsive Power-aware Computing", Retrieved at <<http://groups.csail.mit.edu/cag/codeperf/HoffmannETAL11DynamicKnobs.pdf>>, ASPLOS, Mar. 5-11, 2011, pp. 14.

Isard, et al., "Dryad: Distributed Data-parallel Programs from Sequential Building Blocks", Retrieved at <<http://www-users.cselabs.umn.edu/classes/Spring-2010/csci8211/Readings/Microsoft-Dryad-eurosys07.pdf>>, EuroSys, Mar. 21-23, 2007, pp. 14.

Isard, et al., "Quincy: Fair Scheduling for Distributed Computing Clusters", Retrieved at <<http://citeseerx.ist.psu.edu/viewdoc/download?doi=10.1.1.154.5498&rep=rep1&type=pdf>>, Proceedings of the ACM SIGOPS 22nd symposium on Operating systems principles, Oct. 11-14, 2011, pp. 20.

Kansal, et al., "Virtual Machine Power Monitoring and Provisioning", Retrieved at <<http://www.cse.ohio-state.edu/~agrawal/788-au10/Papers/Oct26/VM-power.pdf>>, SoCC, Jun. 10-11, 2010, pp. 12.

Keys, et al., "The Search for Energy-efficient Building Blocks for the Data Center", Retrieved at <<http://research.microsoft.com/pubs/135873/weed_lncs_final.pdf>>, Workshop on EnergyEfficient Design, Jun. 2010, pp. 12.

Lefurgy, et al., "Power Capping: A Prelude to Power Shifting", Retrieved at <<http://citeseerx.ist.psu.edu/viewdoc/download;jsessionid=27CE88E31198FF91746657A30395D14F?doi=10.1.1.146.4317&rep=rep1&type=pdf>>, Cluster Computing, vol. 11, No. 2, Jun. 2008, pp. 20.

Lewis, et al., "Chaotic Attractor Prediction for Server Run-time Energy Consumption", Retrieved at <<http://www.usenix.org/event/

(56) References Cited

OTHER PUBLICATIONS hotpower10/tech/full_papers/Lewis.pdf>>, Proceedings of the international conference on Power aware computing and systems, 2010, pp. 5.

Lim, et al., "Power Budgeting for Virtualized Data Centers", Retrieved at <<http://research.microsoft.com/pubs/147239/VPSUsenix11.pdf>>, USENIX Annual Technical Conference, Jun. 15, 2011, pp. 1-14.

Meisner, et al., "Peak Power Modeling for Data Center Servers with Switched-mode Power Supplies", Retrieved at <<http://www.eecs.umich.edu/~twenisch/papers/islped10.pdf>>, ISLPED, Aug. 18-20, 2010, pp. 6.

"Joulemeter", Retrieved at <<http://research.microsoft.com/en-us/downloads/fe9e10c5-5c5b-450c-a674-daf55565f794/>>, Retrieved Date: Aug. 16, 2011, pp. 3.

"Windows 2000 Resource Kit Performance Counters, Counters by Object", Retrieved at <<http://msdn.microsoft.com/en-us/library/ms803998.aspx>>, Retrieved Date: Aug. 17, 2011, pp. 1.

"Power Management References", Retrieved at <<http://msdn.microsoft.com/en-us/library/aa373170(v=VS.85).aspx>>, Retrieved Date: Aug. 16, 2011, pp. 1.

"Windows Management Instrumentation", Retrieved at <<http://msdn.microsoft.com/en-us/library/aa394582(v=VS.85).aspx>>, Retrieved Date: Aug. 17, 2011, pp. 3.

Popa, Patsy K., "Managing server energy consumption using IBM PowerExecutive", Retrieved at <<http://www.destinationgreenit.com/wp-content/uploads/2009/04/managing_server_energy_consumption.pdf>>, IBM Power Executive can help you track and manage server energy use, Oct. 2006, pp. 3.

Raghavendra, et al., "No 'Power Struggles': Coordinated Multi-level Power Management for the Data Center", Retrieved at <<http://citeseerx.ist.psu.edu/viewdoc/download?doi=10.1.1.156.115&rep=rep1&type=pdf>>, ASPLOS'08 Mar. 1-5, 2008, pp. 12.

Ranganathan, et al., "Ensemble-level Power Management for Dense Blade Servers", Retrieved at <<http://www.hpl.hp.com/personal/Partha_Ranganathan/papers/2006/2006_isca_ensemble.pdf>>, Proceedings of the 33rd annual international symposium on Computer Architecture, Jun. 17-21, 2006, pp. 12.

Rivoire, et al., "A Comparison of High-level Full-system Power Models", Retrieved at <<http://csl.stanford.edu/~christos/publications/2008.powermodels.hotpower.pdf>>, Proceedings of the 2008 conference on Power aware computing and systems, 2008, pp. 5.

Singh, et al., "Real-time Power Estimation and Thread Scheduling via Performance Counters", Retrieved at <<http://citeseerx.ist.psu.edu/viewdoc/download?doi=10.1.1.141.1881&rep=rep1&type=pdf>>, ACM SIGARCH Computer Architecture News, vol. 37, No. 2, May 2009, pp. 1-10.

Snowdon, et al., "Koala: A Platform for Os-level Power Management", Retrieved at <<http://citeseerx.ist.psu.edu/viewdoc/download?doi=10.1.1.146.4789&rep=rep1&type=pdf>>, Eurosys, Apr. 1-3, 2009, pp. 14.

Szalay, et al., "Low-power Amdahl-balanced Blades for Data-intensive Computing", Retrieved at <<http://www.seas.gwu.edu/~howie/publications/HotPower09.pdf>>, ACM SIGOPS Operating Systems Review, vol. 44, No. 1, Jan. 2010, pp. 5.

Wang, et al., "Cluster-level Feedback Power Control for Performance Optimization", Retrieved at <<http://web.eecs.utk.edu/~xwang/papers/hpca08.pdf>>, The 14th IEEE International Symposium on High-Performance Computer Architecture, 2008, pp. 10.

* cited by examiner

100

ESTIMATING AND MANAGING POWER CONSUMPTION OF COMPUTING DEVICES USING POWER MODELS

BACKGROUND

Current data centers cost about $10 million per megawatt to build, and around 80% of the facility cost is related to power infrastructure. While the operation of data centers is still dominated by the cost of hardware equipment rather than power consumption, power costs are rising while the cost of hardware is dropping. Thus, managing the power consumption of data centers has become a focus of research.

Designing and operating energy-efficient data centers involves an understanding of the relationship between resource usage and system-level power consumption. Legacy servers lack the ability to monitor their own power consumption. Retrofitting large numbers of servers with metering and monitoring or replacing these servers before the end of their life cycle is economically unfeasible. Furthermore, the cost of new servers and data center infrastructure can be reduced by not including additional hardware for power monitoring and measurement.

SUMMARY

The power consumption of computing devices is monitored along with performance counters and used to generate a power model for each computing device. The power models are used to later estimate the power consumption of each computing device based on the performance counters without additional hardware. Each computing device in a cluster is assigned a power cap, the upper bound of the number of watts that a computing device may use, and a software-based power control at each computing device monitors the performance counters, estimates the power consumption using the performance counters and the model, and compares the estimated power consumption with the power cap. Depending on whether the estimated power consumption violates the power cap, the power control may transition the computing device to a lower power state to prevent a violation of the power cap. The power model may be further used to determine if a computing device can transition to a higher power state without violating the power cap.

In an implementation, a power model is received at a computing device. A power cap is received at the computing device. A power consumption of the computing device is estimated using the power model. A current power state of the computing device is adjusted or maintained based on the power cap and the estimated power consumption.

In an implementation, a power consumption of a computing device is monitored over a first time period. Values of performance counters associated with an operating system executing at the computing device are monitored over the first time period. A model of the power consumption of the computing device is generated based on the monitored power consumption and the monitored values of the performance counters.

In an implementation, a power policy manager is adapted to store a power cap and a power model for each of a plurality of computing devices. Each computing device is adapted to operate at a first power state, receive a power model from the power policy manager, receive a power cap from the power policy manger, estimate a power consumption of the computing device at a second power state using the power model, and maintain the computing device at the first power state or transition to the second power state based on the power cap and the estimated power consumption.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
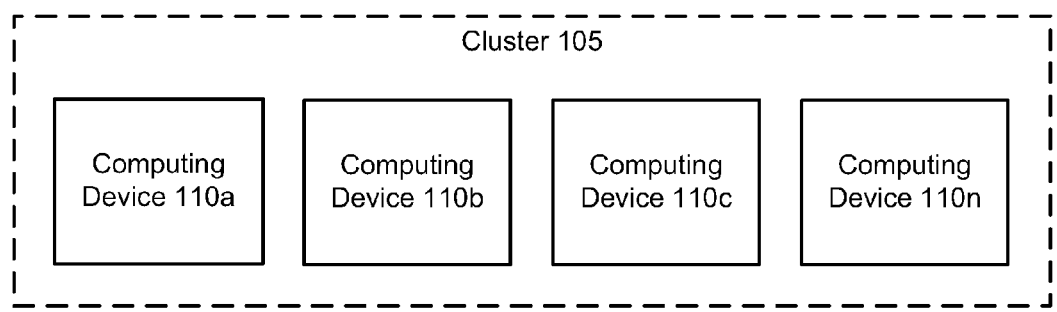
FIG. 1 is an illustration of an example environment for providing computing resources using a cluster.

FIG. 1 is an illustration of an example environment 100 for providing computing resources using a cluster. A cluster 105 may be a grouping of one or more computing devices. As illustrated, the cluster 105 includes a plurality of computing devices (i.e., computing devices 110a, 110b, 110c, and 110n). Hereinafter the computing devices 110a, 110b, 110c, and 110n may be individually referred to as the computing device 110. Each computing device 110 may be implemented using a general purpose computing device 110 such as the computing system 800 illustrated in FIG. 8, for example. While four computing devices 110 are shown in the cluster 105, it is for illustrative purposed only; there is no limit to the number of computing devices 110 that may be part of a cluster 105.

In some implementations, the cluster 105 and the corresponding computing devices 110 may operate to perform a common task or service for users or applications. For example, the computing devices 110 of the cluster 105 may provide search engine services, cloud storage or computing services, streaming music or video related services, and videogame related services. Any other type of task or service may be provided by the cluster 105.

In some implementations, each computing device 110 in the cluster 105 may be implemented using the same or similar type or configuration of computer or computing system. For example, each computing device 110 may be implemented using the same operating system, processor, amount of memory, number and type of hard disk drives, etc. However, in other implementations, some of the computing devices 110 in the cluster 105 may be implemented using different types or configurations.

One or more clusters may be housed together in what are commonly referred to as data centers. These data centers may use the one or more clusters to provide a variety of tasks and services to users and applications. Where many clusters are part of a data center, the amount of power needed for each of the computing devices 110 of the clusters to operate may be large. Because of legacy computing devices 110, and the different types and configurations of the computing devices 110 used to implement the clusters, predicting and capping the power usage of the clusters may be difficult.

Accordingly, as will be described further below (e.g. with respect to FIG. 2), a power model may be generated for each computing device 110 by monitoring the power consumption of each computing device or a subset of the computing devices in the cluster along with resource utilization metrics of each computing device, or the corresponding subset of the computing devices in the cluster, over some period of time. The power models may then later be used to predict the power consumption of the computing devices 110, or a class of computing devices 110, based on the same resource utilization metrics using software at each computing device 110 without expensive external power monitoring hardware. The predicted power consumption may be used to adjust various power management settings of the computing devices 110 to reduce their power consumption. By predicting the power consumption using software, the power consumption of computing devices 110 may be controlled without additional hardware.

Figure 2:
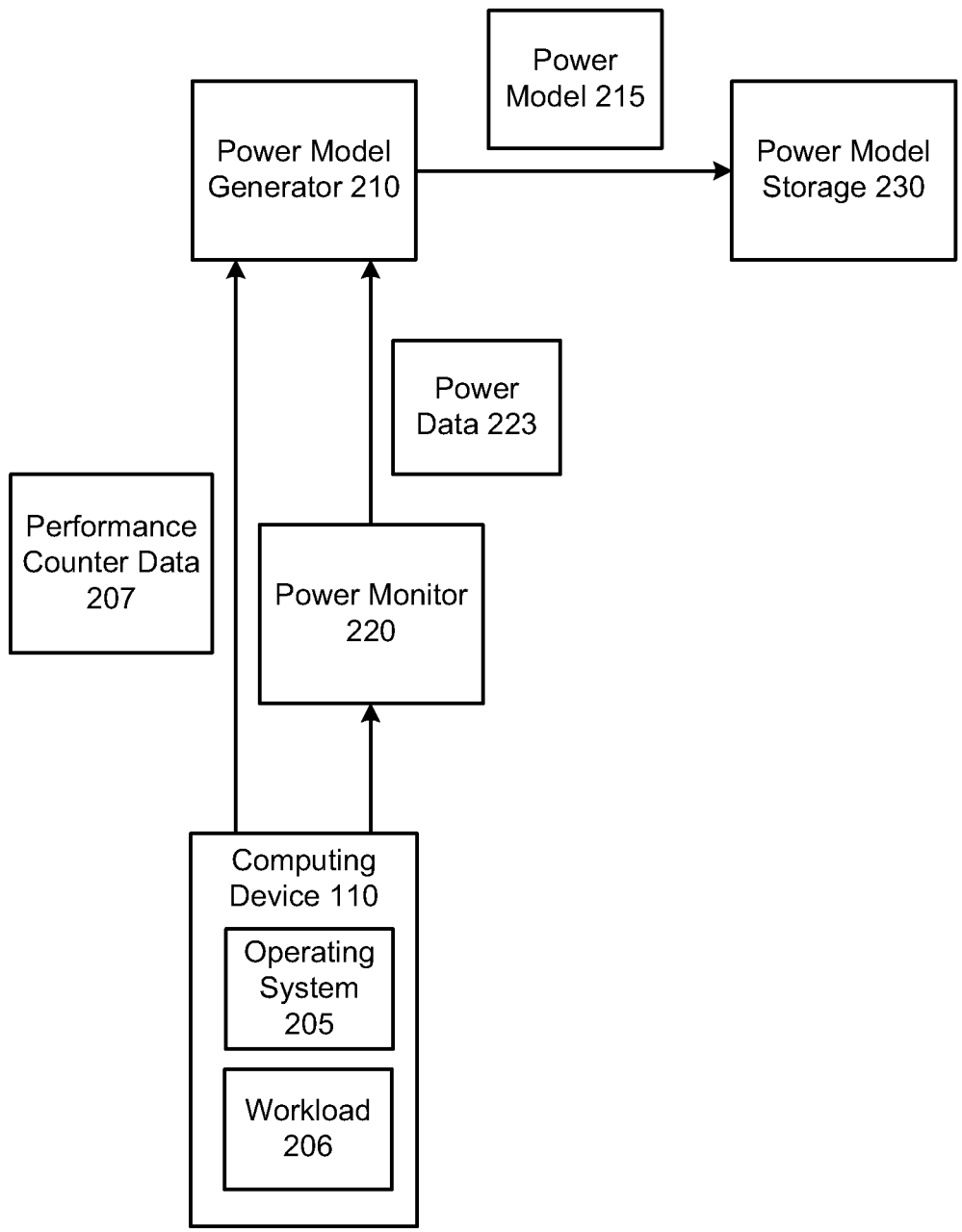
FIG. 2 is an example environment for generating a power model for a computing device.

FIG. 2 is an example environment 200 for generating a power model 215 for a computing device 110. As illustrated, the environment 200 may comprise several components including the computing device 110, a power monitor 220, a power model generator 210, and a power model storage 230. More or few components may be supported.

The power model 215 may be a model of the power consumption of a computing device 110 and may be used to predict a current or future power usage of the computing device 110 based on values of one or more resource utilization metrics associated with the computing device 110. The resource utilization metrics may be provided by an operating system 205 executing on the computing device 110. The predicted current or future power consumption of the computing device 110 may be used to maintain, reduce, or increase a power state of the computing device 110 to keep the power used by the computing device 110 below a power cap.

In addition, in some implementations, the power model 215 may further be used to predict the future power usage of the computing device 110 based on values of the resource utilization metrics associated with the computing device and a proposed power state of the computing device 110. The proposed power state may be a power state that is either greater than or less than a current power state of the computing device 110. The predicted future power consumption at the proposed power state may be used to determine whether to transition the computing device 110 to the proposed power state, or to maintain the current power state of the computing device 110, for example.

The power model generator 210 may generate a power model 215 for a computing device 110 by monitoring the resource utilization metrics and the power usage of the computing device 110 over a period of time. The period of time may be selected by a user or administrator, and may be any period of time such as 15 minutes, one hour, one day, one week, etc., for example.

The power model generator 210 may generate power models for a variety of computing devices and computing device 110 configurations. For example, the power model generator 210 may generate a power model 215 for computing devices 110 that use a particular type or speed of processor, that have a particular operating system 205, or that have a particular amount of memory or number of hard disk drives. In addition, the power model generator 210 may generate power models for specific software applications or tasks that are associated with the computing devices 110. For example, the power model generator 210 may generate a power model 215 for computing devices 110 that implement search engines, and a power model 215 for computing devices 110 that implement storage services.

In some implementations, to generate a power model 215, the power model generator 210 may have the computing device 110 execute what is referred to herein as a workload 206 and may monitor the resource utilization metrics and the power usage of the computing device 110 during the execution of the workload 206. The workload 206 may be a collection of applications and tasks selected to simulate a typical workload that the computing device 110 may experience as part of a cluster 105. Thus, the workload 206 may be different for computing devices 110 that are associated with search engine applications than computing devices 110 that are used to serve audio files, for example. The applications or tasks in the workload 206 may further be selected to target specific performance areas of the computing device 110 such as memory usage, disk usage, network usage, and CPU usage, for example.

The power monitor 220 may monitor the power usage of the computing device 110 during the execution of the workload 206. The power monitor 220 may determine the power usage of the computing device at predetermined intervals and may provide the determined power usage at each interval as the power data 223. In some implementations, the monitoring intervals may be one second intervals. Larger or smaller intervals may be used.

In some implementations, the power monitor 220 may be one of a variety of commercially available power meters. For example, the power monitor 220 may be the Watts Up? Pro power meter by Electronic Educational Devices, Denver, Colo. A power supply of the computing device 110 may plug into the power monitor 220, and the power monitor 220 may then plug into an available electrical power socket. Any other techniques for monitoring the power usage of a computing device 110 may also be used.

The power model generator 210 may further monitor resource utilization metrics of the computing device 110. The power model generator 210 may monitor the resource utilization of the computing device 110 during execution of the workload 206. The resource utilization metrics may include CPU usage, disk usage, memory usage, CPU percent idle time, CPU frequency, and network usage, for example. Other resource utilization metrics may be used. The particular resources that are monitored by the computing device 110 may be set by a user or administrator, and may depend on or be selected based on the type of computing device 110 (e.g., processor, number of hard disks, and amount of memory) or the type of operating system 205, for example.

More specifically, the resource utilization metrics may include values of one or more performance counters. A performance counter may be a value that is published by the operating system 205 that represents a particular resource utilization metric for the computing device 110. The particular values and performance counters that are published by the operating system 205 may depend on the type of operating system 205 and/or the configuration of the computing device 110. The values of the performance counters published by the operating system during an interval may be provided to the power model generator 210 as the performance counter data 207.

The values of the particular performance counters that are part of the performance counter data 207 may be selected by a user or administrator. As may be appreciated, there are thousands of performance counters that are published by the operating system 205 and monitoring all of the available performance counters may be inefficient. To minimize the number of performance counters that are monitored, a user or administrator may eliminate performance counters from consideration that are not found to be associated with power usage. The user or administrator may further eliminate performance counters that are redundant of other performance counters, proxies for other performance counters, or that are inversely related to other performance counters. Other methods or techniques for reducing the number of performance counters that are monitored may be used. In some implementations, the counters may be selected using one or more of regularization, step-wise searches, and hypothesis testing techniques.

For example, when monitoring performance counters using Event Tracing for Windows™, an example subset of the performance counters that were selected to be part of the performance counter data 207 for a variety of computing devices 110, although other computing devices 110 may use other performance counters, is illustrated below in Table 1:

TABLE 1

Example Performance Counters

Performance Counter
\IPv4\Datagram/sec
\Memory\Page Faults/sec
\Memory\Committed Bytes
\Memory\Cache Faults/sec
\Memory\Pages/sec
\Memory\Page Reads/sec
\Memory\Pool Nonpaged Allocs
\PhysicalDisk(_Total)\% Disk Time
\PhysicalDisk(_Total)\Disk Bytes/sec
\Process(_Total)\Page Faults/sec
\Process(_Total)\IO Data Bytes/sec
\Processor(_Total)\% Processor Time
\Processor(_Total)\Interrupts/sec
\Processor(_Total)\% DPC Time
\Cache\Data Map Pins/sec
\Cache\Pin Reads/sec
\Cache\Pin Read Hits %
\Cache\Copy Reads/sec
\Cache\Fast Read Not Possibles/sec
\Cache\Lazy Write Flushes/sec
\Job Object Details(_Total/_Total)\Page File Bytes Peak
\Processor Performance(PPM_Processor_0)\% of Maximum Frequency The power model generator 210 may generate a power model 215 for a computing device 110 based on the performance counter data 207 and the power data 223 collected during the interval. The power model generator 210 may generate each model 215 using a variety of known statistical modeling techniques including least-square regression. Other statistical techniques may be used. In some implementations, a model 215 may be fitted by the power model generator 210 using statistical techniques such as least square fitting and model selection and model comparison techniques common in the statistical methodology.

Each power model 215 may be implemented using a variety of model types including a linear power model, a non-linear power model, a quadratic power model, a piecewise linear power model, and a switching power model. Other types of models may be used. In some implementations, the type of power model 215 used may be a tradeoff between the accuracy and complexity of the power model. The power models 215 generated by the power model generator 210 may be stored in the power model storage 230.

Figure 3:
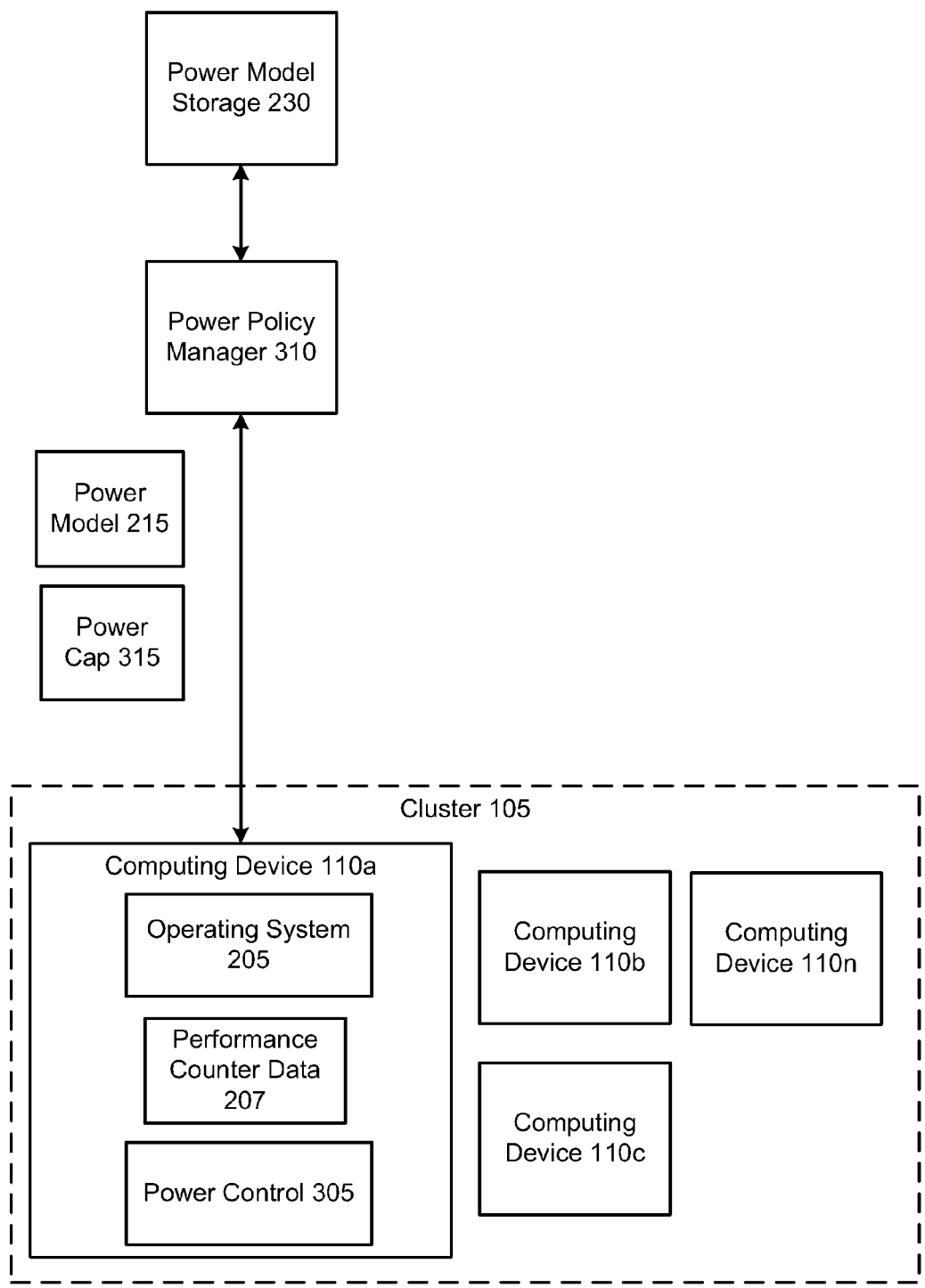
FIG. 3 is an illustration of an example environment for predicting the power usage of computing devices in a cluster and adjusting the power state of one or more of the computing devices in the cluster based on the predicted power usage.

FIG. 3 is an illustration of an example environment 300 for predicting the power usage of computing devices 110 in a cluster 105 and adjusting the power state of one or more of the computing devices 110 in the cluster 105 based on the predicted power usage. As illustrated, the environment 100 includes several components including the power model storage 230, a power policy manager 310, the cluster 105, and the computing devices 110a-n. More or fewer components may be supported.

The power policy manager 310 may provide a power model 215 and a power cap 315 to each of the computing devices 110 in the cluster 105. The power cap 315 may be an upper bound of the number of watts that a computing device 110 may use, for example. The power cap 315 provided to each computing device 110 in the cluster 105 may be a fraction of an overall system-wide power cap provided to the cluster 105. Thus, if the total system-wide power cap provided to the cluster 105 of four computing devices is 1000 Watts, each computing device may receive a power cap 315 of 250 Watts.

The power cap 315 provided to each computing device 110 in the cluster 105 may be the same power cap 315 or may be different for some or all of the computing devices 110 in the cluster 105. For example, depending on the tasks or services provided by the computing devices 110 in the cluster 105, one or more of the computing devices 110 may be a bottleneck with respect to the task or service performed by the other computing devices 110. In such scenarios, the computing device(s) 110 that are the bottlenecks may receive higher power caps 315 than the other computing devices 110 in the cluster 105. In some implementations, the power cap 315 for each of the computing devices 110 may be based on one of performance objectives for each computing device 110 or the cluster 105, and compliance with the system-wide power cap.

Each computing device 110 may include a power control 305. The power control 305 may estimate a current or future power usage of the computing device 110, and may enforce the power cap 315 provided to the computing device 110. In some implementations, the power control 305 may enforce the power cap 315 by increasing, decreasing, or maintaining a current power state of the computing device 110. In other implementations, the power control 305 may enforce the power cap 315 by increasing, decreasing, or maintaining a frequency of, or voltage provided to, one or more processors or other components of the computing device 110.

With respect to power states, in some implementations, each power state may specify a set of processor frequencies that are available to a computing device 110. Each successive power state may reduce the number of processor frequencies that are available to the computing device 110. For example, at a first power state, the processor of a computing device 110 may operate at a 100% maximum frequency, an 80% maximum frequency, a 60% maximum frequency, and a 50% maximum frequency. At a second power state, the processor of the computing device 110 may operate at an 80% maximum frequency, a 60% maximum frequency, and a 50% maximum frequency. At a third power state, the processor of the computing device 110 may operate at a 60% maximum frequency and a 50% maximum frequency. Each power state may further be associated with power management settings for one or more devices associated with the computing device 110. The devices may include peripheral devices such as monitors or may include components such as hard-disk drives or memory modules.

The power control 305 may determine the values of performance counters provided by the operating system 205 (e.g., the performance counter data 207), and may use the determined values along with the power model 215 to estimate a power consumption of the computing device 110. Depending on the implementation, the estimated power consumption may be an estimate of a future power consumption or a current power consumption.

The power control 305 may determine whether to adjust or maintain the current power state of the computing device 110 based on the estimated power consumption. If the estimated power consumption is above the power cap 315 assigned to the computing device 110 by the power policy manager 310, then the power control 305 may reduce the power state of the computing device 110 (e.g., reduce a frequency of a processor or other component of the computing device 110, or reduce the number of frequencies available to the processor or other component of the computing device 110). Otherwise, the power control 305 may maintain the current power state of the computing device 110.

In some implementations, the power cap 315 may include a minimum power threshold and a maximum power threshold. If the estimated power consumption of the computing device 110 is above the first threshold, then the power control 305 may reduce the power state of the computing device 110. If the estimated power consumption of the computing device 110 is below the first threshold and above the second threshold, then the power control 305 may maintain the current power state of the computing device 110. If the estimated power consumption of the computing device 110 is below the second threshold, then the power control 305 may increase the current power state of the computing device 110.

After determining whether to maintain or change the power state of the computing device 110, the power control 305 may wait some amount of time before again determining the values of the performance counters and estimating the power consumption of the computing device 110. The power control 305 may wait 1 second, 1 minute, or ten minutes, for example. Any amount of time may be used. By waiting the amount of time before re-determining the performance counters and estimating the power consumption, the power control 305 may allow any previous changes made to the power state of the computing device 110 to be reflected in the values of the performance counters. In addition, the waiting period may prevent performance penalties that may be associated with excessive power state changes.

For some computing devices 110 and their associated power models 215, the power consumption of the computing device 110 may be sporadic or many change rapidly. For these computing devices 110, the predicted power consumption of the computing device 110 may not be a good predictor of its future power consumption, and determining whether to adjust the power state of the computing device 110 based on the estimated current power consumption may not be effective at controlling the power consumption of the computing device 110. For example, by the time the decision to maintain or adjust the power state of such a computing device 110 has been made by the power control 305, the power consumption of the computing device 110 may have already changed.

Where the estimated power consumption is a good indicator of the future power consumption of a computing device 110, the power control 305 may control the power states of the computing device 110 as described above. Where the estimated power consumption is not a good indicator of future power consumption, rather than make the determination to adjust or maintain the power state of the computing device 110 based on a single set of performance counter data 207, the power control 305 may instead monitor the performance counter data 207 over a predetermined duration of time or window and make the determination based on the monitored performance counter data 207 and the power model 215. The predetermined duration of time or window may be any amount of time such as 1, 5, or 10 minutes, for example.

The power control 305 may determine how many times the power consumption of the computing device 110 is estimated to be greater than the power cap 315 during the predetermined duration of time, and may compare the number of times to a threshold. If the estimated number of times is greater than the threshold, then the power control 305 may determine to decrease the power state of the computing device 110. If the estimated number of times is below the threshold, then the computing device 110 may maintain the current power state of the computing device 110, or alternatively increase the power state of the computing device 110.

In some implementations, rather than adjust or maintain the power state of the computing device 110 based on the estimated power consumption, the power control 305 may use the power model 215 and the performance counter data 207 to estimate the power consumption of the computing device 110 after the computing device 110 has transitioned to a proposed power state. If the estimated power consumption of the computing device 110 at the proposed power state is below the power cap 315, then the power control 305 may transition the computing device 110 to the proposed power state. Otherwise, the power control 305 may maintain the current power state of the computing device 110, or may even estimate the power consumption of the computing device 110 at a different proposed power state.

For example, a computing device 110 may be operating in a second power state that is a lower power state than a first power state. The power control 305 may use the power model 215 and the performance counter data 207 to estimate the power consumption of the computing device 110 if the computing device 110 transitions to the first power state. If the estimated power consumption at the first state is below the power cap 315, then the power control 305 may transition the computing device 110 to the first power state. Otherwise, the power control 305 may maintain the computing device 110 in the second power state.

Additionally, the power control 305 may use the power model 215 and the performance counter data 207 to estimate the power consumption of the computing device 110 if the computing device 110 maintains at the second power state. If the estimated power consumption at the second state is below the power cap 315, then the power control 305 may maintain the computing device 110 at the second power state. Otherwise, the power control 305 may consider transitioning the computing device 110 to a third power state that is lower than the second power state. The power control 305 may continue to estimate the power consumption of the computing device 110 at further reduced power states until a power state with an estimated consumption that is below the power cap 315 is found.

In some implementations, the power control 305 may use the power model 215 and the performance counter data 207 to generate multiple estimates of the power consumption of the computing device 110 at a proposed power state. The estimates may be made over a predetermined duration or window of time. The power control 305 may determine the number of times that the estimated power consumption at the proposed power state or current power state exceeds the power cap 315, and if the determined number of times exceeds a threshold, the power control 305 may maintain the computing device 110 at the current power state or at a lower power state. Otherwise, the power control 305 may transition the computing device 110 to the proposed power state.

As may be appreciated, the power policy manager 310, power models 215 and power controls 305 described herein provide several advantages. One advantage is the lack of a need to use specialized hardware to monitor the power consumption of the computing devices 110. The power consumption of each computing devices 110 is estimated using a software-based power control 305, rather than an external hardware power meter or a specialized hardware component of the computing devices 110. Using a software-based power control 305 for each computing device 110 is less expensive than purchasing specialized hardware for each computing device 110, and allows for power monitoring on legacy and/or new computing devices 110.

Still another advantage is that, in some implementations, the power control 305 controls the power consumption of the computing devices 110 by restricting a computing device 110 to a particular power state, rather than directly adjusting the voltage or frequency of one or more components of the computing device 110. The operating system 205 of the computing device 110 is then free to use its own existing power management capabilities within the parameters defined by the power state that computing device 110 is restricted to.

Figure 4:
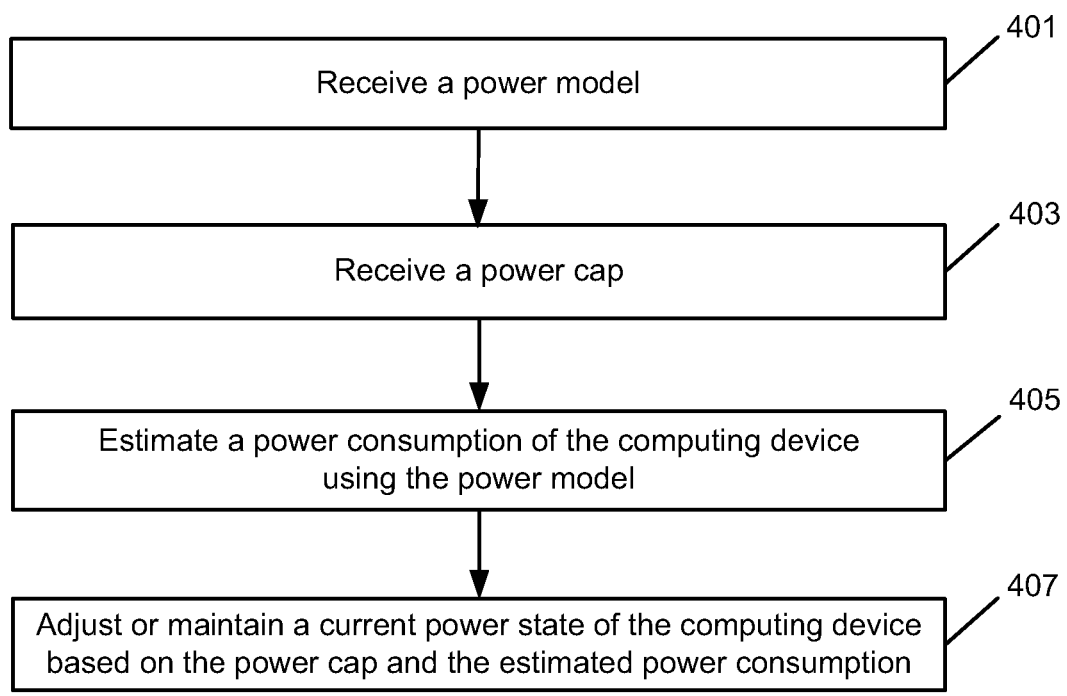
FIG. 4 is an operational flow of an implementation of a method for adjusting or maintaining a power state of a computing device using a power model.

FIG. 4 is an operational flow of an implementation of a method 400 for adjusting or maintaining a power state of a computing device 110 using a power model 215. The method 400 may be implemented by the power control 305, for example.

A power model is received at 401. The power model 215 may be received by a power control 305 of a computing device 110 from the power policy manager 310. The power model 215 may be based on a type or configuration of the computing device 110, and/or may be based on an application or task performed by the computing device 110. The computing device 110 may be part of a cluster 105 of computing devices 110 in a data center. For example, the computing device 110 may be part of a cluster 105 of computing devices 110 implementing a search engine.

A power cap is received at 403. The power cap 315 may be received by the power control 305 of the computing device 110. The power cap 315 may be a fraction of an overall power cap for the cluster 105. Each computing device 110 may receive the same power cap 315, or may receive different power caps 315.

A power consumption of the computing device 110 is estimated using the power model at 405. The power consumption may be estimated by the power control 305 of the computing device 110. In implementations where the current power consumption of the computing device 110 is an accurate estimate of future power consumption, the power consumption may be estimated by determining values of performance counters published by an operating system 205 of the computing device 110, and estimating the power consumption using the power model 215 and the determined values.

In implementations where the current power consumption is not an accurate estimate of future power consumption, the power control 305 may monitor the values of the performance counters over a predetermined duration of time, and calculate multiple estimations of the power consumption of the computing device 110 using the values of the performance counters and the power model 215 throughout the predetermined duration. In implementations where the estimated power consumption is an estimate of the future power consumption of the computing device 110 at a proposed power state, the power control 305 may estimate the power consumption of the computing device 110 by determining values of the performance counters, and estimating the power consumption using the power model 215, the determined values, and the proposed power state.

A current power state of the computing device may be adjusted or maintained based on the power cap and the estimated power consumption at 407. The power state may be adjusted or maintained by the power control 305 of the computing device 110. In some implementations, the power control 305 may determine if the estimated power consumption is above the power cap 315, and if so, may adjust the power state by reducing the power state to a lower power state. Otherwise, the power control 305 may maintain the computing device 110 at a current power state.

In implementations where multiple estimates of the power consumption of the computing device 110 were made by the power control 305 over a predetermined duration of time, a determination may be made by the power control 305 of how many times the power consumption was estimated to be greater than the power cap 315 during the predetermined duration. If the determined number of times is greater than a threshold, the power control 305 may adjust the power state by reducing the power state to a lower power state. Otherwise, the power control 305 may maintain the computing device 110 at a current power state.

In implementations where the estimated power consumption is an estimated future power consumption of the computing device 110 at a proposed power state, the power control 305 may determine if the estimated future power consumption will be above or below the power cap 315. If the estimated future power consumption will be below the power cap 315, then the power control 305 may transition the computing device 110 to the proposed power state. Otherwise, the power control 305 may maintain the computing device 110 at a current power state.

Figure 5:
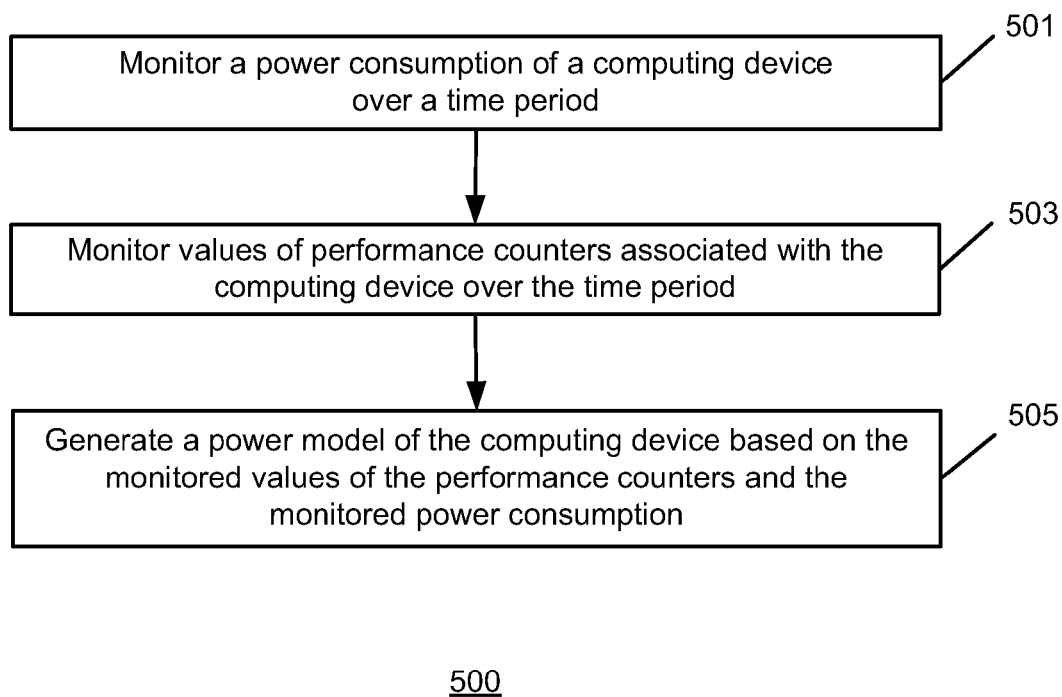
FIG. 5 is an operational flow of an implementation of a method for generating a power model of a computing device.

FIG. 5 is an operational flow of an implementation of a method 500 for generating a power model 215 of a computing device 110. The method 500 may be implemented by a power model generator 210.

A power consumption of a computing device is monitored over a time period at 501. The power consumption may be monitored by the power monitor 220. In some implementations, the power consumption may be a measure of the power used by a computing device 110 while executing a selected workload 206. The workload 206 may include one or more selected applications or tasks for the computing device 110. The power consumption of the computing device 110 may be monitored at predetermined intervals such as one second intervals, for example. The length of the time period that the power consumption is monitored may be selected by a user or administrator, or may be equal to, or otherwise based on, a time that it takes the computing device 110 to complete the workload 206.

Values of a plurality of performance counters associated with the computing device 110 are monitored over the time period at 503. The values of the plurality of performance counters may be comprised within the performance counter data 207 and may be monitored by the power model generator 210. The performance counter data 207 may be published or provided to the model generator 210 by an operating system 205 of the computing device 110. The particular values and performance counters that are published by the operating system 205 may depend on the type of operating system 205 and/or the configuration of the computing device 110. Example performance counters are illustrated in Table 1.

A power model of the computing device 110 is generated based on the monitored values of the plurality of performance counters and the monitored power consumption at 505. The power model 215 may be generated by the power model generator 210. The power model 215 may be stored by the power model generator 210 along with a plurality of other power models 215 for a variety of other computing devices 110 in a power model storage 230. At a later time, the power model 215 corresponding to a type of computing device 110, or an application or task associated with the computing device 110, may be used to estimate the power consumption of the computing device 110 based on performance counter data 207. The estimated power consumption may be used to keep the power consumed by the computing device 110 below a power cap 315 without having to directly monitor the power consumed using a power monitor 220.

Figure 6:
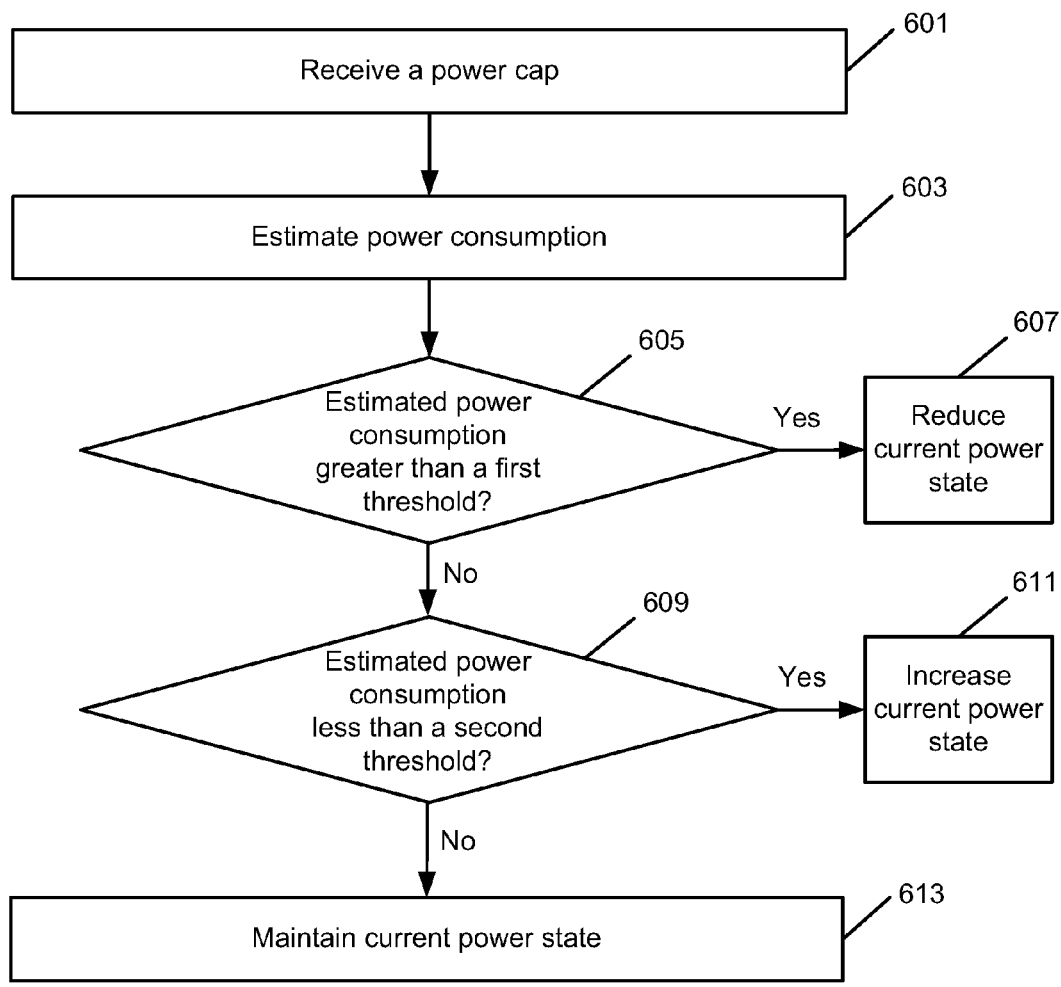
FIG. 6 is an operational flow of an implementation of a method for determining whether to adjust or maintain a power state of a computing device.

FIG. 6 is an operational flow of an implementation of a method 600 for determining whether to adjust or maintain a power state of a computing device. The method 600 may be implemented by a power control 305 of a computing device 110.

A power cap is received at 601. The power cap 315 may be received by a power control 305 of a computing device 110. The computing device 110 may be one of a plurality of computing devices executing as part of a cluster 105 in a data center. The power cap 315 may be a fraction of an overall power cap allotted to the cluster 105.

In some implementations, the power cap 315 may include a first threshold and a second threshold. The first threshold may represent an upper bound for the power consumption of the computing device 110, and the second threshold may represent a lower bound for the power consumption of the computing device 110.

A power consumption is estimated at 603. The power consumption of the computing device 110 may be estimated by the power control 305 using a power model 215 associated with the computing device 110 and performance counter data 207 provided by an operating system 205 of the computing device 110.

A determination is made of whether the estimated power consumption is greater than the first threshold at 605. The determination may be made by the power control 305 of the computing device 110. If it is determined that the estimated power is greater than the first threshold, then the computing device 110 is estimated to be using too much power and the method 600 may continue at 607. Otherwise, the method 600 may continue at 609.

A current power state of the computing device is reduced at 607. The current power state may be reduced by the power control 305 of the computing device 110. In some implementations, there may be a plurality of power states with each power state further restricting one or more power management options available to the operating system 205. For example, each power state may be associated with fewer operating frequencies for a processor of the computing device 110.

A determination is made of whether the estimated power consumption is less than the second threshold at 609. The determination may be made by the power control 305 of the computing device 110. If it is determined that the estimated power is less than the second threshold, then the computing device 110 is estimated to be using too little power and the method 600 may continue at 611. Otherwise, the method 600 may continue at 613.

The current power state is increased at 611. The current power state may be increased by the power control 305 of the computing device 110.

The current power state is maintained at 613. The current power state may be maintained by the power control 305 of the computing device 110. Because the estimated power consumption of the computing device 110 is between the first and the second thresholds of the power cap 315, there is no need to change the current power state of the computing device 110 by the power control 305.

Figure 7:
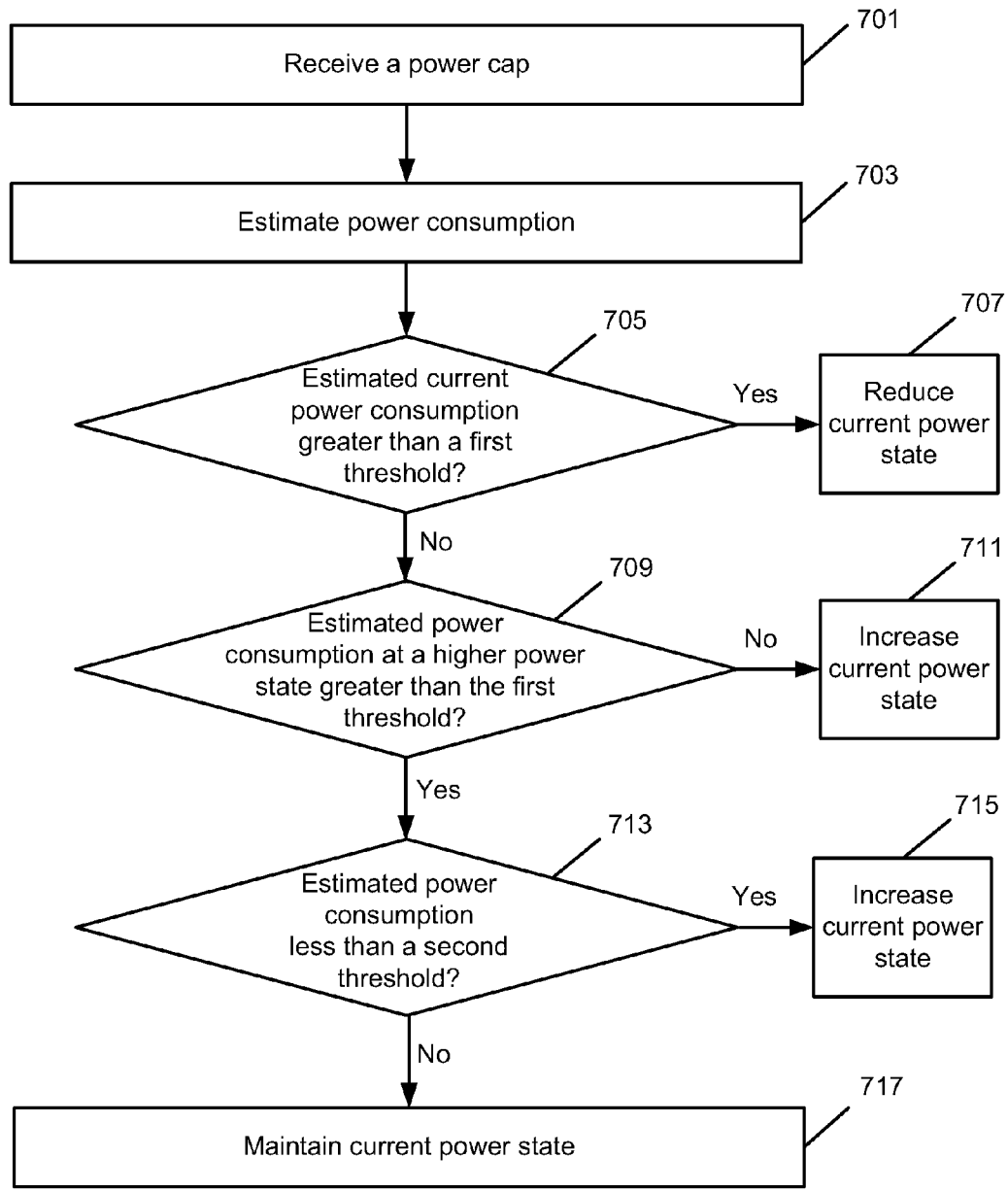
FIG. 7 is an operational flow of an implementation of another method for determining whether to adjust or maintain a power state of a computing device.

FIG. 7 is an operational flow of an implementation of another method 700 for determining whether to adjust or maintain a power state of a computing device. The method 700 may be implemented by a power control 305 of a computing device 110.

A power cap is received at 701. The power cap 315 may be received by a power control 305 of a computing device 110. The computing device 110 may be one of a plurality of computing devices executing as part of a cluster 105 in a data center. The power cap 315 may be a fraction of an overall power cap allotted to the cluster 105.

In some implementations, the power cap 315 may include a first threshold and a second threshold. The first threshold may represent an upper bound for the power consumption of the computing device 110, and the second threshold may represent a lower bound for the power consumption of the computing device 110.

At 703, a power consumption is estimated. The power consumption of the computing device 110 may be estimated by the power control 305 using a power model 215 associated with the computing device 110 and performance counter data 207 provided by an operating system 205 of the computing device 110. The estimate may include an estimate of the current power consumption of the computing device 110, and an estimate of the power consumption of the computing device 110 at a higher proposed power state. In some implementations, the power control 305 may estimate the current power consumption and the power consumption of the computing device 110 at the higher proposed power state multiple times over a predetermined duration or window of time.

At 705, a determination is made of whether the estimated current power consumption is greater than the first threshold. The determination may be made by the power control 305 of the computing device 110. If it is determined that the estimated current power is greater than the first threshold, then the computing device 110 is estimated to be using too much power and the method 700 may continue at 707. Otherwise, the method 700 may continue at 709.

Where there are multiple estimations of the current power consumption over a window of time, the power control 305 may determine a total number of times that the estimated current power consumption exceeded the first threshold, and if it is greater than a predetermined number, the power control 305 may determine that the first threshold was exceeded and the method 700 may continue at 707.

At 707, a current power state of the computing device is reduced. The current power state may be reduced by the power control 305 of the computing device 110.

At 709, a determination is made of whether the estimated power consumption at the higher proposed power state is greater than the first threshold. The determination may be made by the power control 305 of the computing device 110. If it is determined that the estimated power at the proposed power state is greater than the first threshold, then the computing device 110 may be predicted to use too much power at the proposed higher power state and the method 700 may continue at 713. Otherwise, the method 700 may continue at 711.

Where there are multiple estimations of the power consumption at the proposed higher power state over a window of time, the power control 305 may determine a total number of times that the estimated power consumption at the proposed higher state exceeded the first threshold, and if it is greater than a predetermined number, the power control 305 may determine that the first threshold was exceeded and the method may continue at 713.

At 711, the current power state of the computing device is increased. The current power state may be increased by the power control 305 of the computing device 110 to the proposed higher power state.

At 713, a determination is made of whether the estimated current power consumption is less than the second threshold. The determination may be made by the power control 305 of the computing device 110. If it is determined that the estimated current power is less than the second threshold, then the computing device 110 is estimated to be using too little power and the method 700 may continue at 715. Otherwise, the method 700 may continue at 717.

At 715, the current power state is increased. The current power state may be increased by the power control 305 of the computing device 110. The current power state may be increased to a power state that is higher than the current power state, but lower than the proposed higher power state.

At 717, the current power state is maintained. The current power state may be maintained by the power control 305 of the computing device 110.

Figure 8:
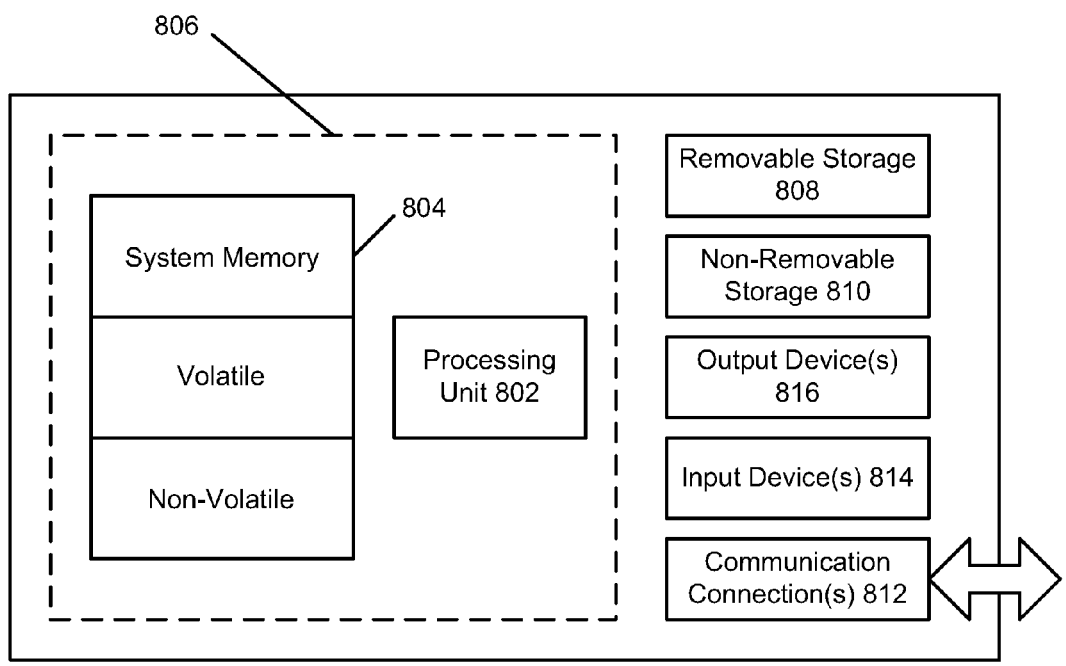
FIG. 8 shows an exemplary computing environment in which example embodiments and aspects may be implemented.

FIG. 8 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing system 800. In its most basic configuration, computing system 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing system 800 may have additional features/functionality. For example, computing system 800 may include additional storage (removable and/or non-removable) including, but not limited to, magnetic or optical disks or tape. Such additional storage is illustrated in FIG. 8 by removable storage 808 and non-removable storage 810.

Computing system 800 typically includes a variety of computer readable media. Computer readable media can be any available media that can be accessed by computing system 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 800. Any such computer storage media may be part of computing system 800.

Computing system 800 may contain communication connection(s) 812 that allow the device to communicate with other devices. Computing system 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving a power model at a computing device, wherein the computing device is part of a cluster of computing devices;
receiving a power cap at the computing device, wherein the power cap and the power model are received from a power policy manager that is separate from the cluster of computing devices, and wherein the power cap is based on one or more tasks performed by the computing device;
determining values of a plurality of performance counters associated with the computing device;
estimating a power consumption of the computing device using the power model and the values of the plurality of performance counters; and
adjusting or maintaining a current power state of the computing device based on the power cap and the estimated power consumption.

2. The method of claim 1, wherein the power is estimated without power monitoring hardware.

3. The method of claim 1, wherein the power cap comprises an upper bound and a lower bound, and adjusting or maintaining a current power state of the computing device based on the power model comprises:
determining if the estimated power consumption of the computing device is less than the upper bound and greater than the lower bound, and if so, maintaining the current power state of the computing device;
determining if the estimated power consumption of the computing device is greater than the upper bound, and if so, decreasing the current power state of the computing device to a lower power state; and
determining if the estimated power consumption of the computing device is less than the lower bound, and if so, increasing the current power state of the computing device to a higher power state.

4. The method of claim 1, further comprising a plurality of power states, wherein each power state is associated with a subset of a plurality of processor frequencies supported by the computing device or power management settings of one or more devices associated with the computing device.

5. The method of claim 1, further comprising measuring a plurality of performance counters associated with the computing device for a predetermined duration of time, and estimating the power consumption of the computing device using the power model and the plurality of performance counters measured during the predetermined duration of time.

6. The method of claim 5, wherein adjusting or maintaining a current power state of the computing device based on the power cap and the estimated power consumption comprises:
determining a number of times that the power consumption is estimated to be greater than the power cap during the predetermined duration of time;
determining if the number of times is greater than a threshold; and
decreasing the current power state of the computing device to a lower power state if the determined number of times is greater than the threshold.

7. The method of claim 5, wherein adjusting or maintaining a current power state of the computing device based on the power cap and the estimated power consumption comprises:
determining a number of times that the power consumption at a proposed power state is estimated to be greater than the power cap during the predetermined duration of time;
determining if the number of times is below a threshold; and
changing the current power state of the computing device to the proposed power state if the determined number of times is below the threshold.

8. The method of claim 1, wherein estimating a power consumption of the computing device using the power model further comprises estimating a power consumption of the computing device at a proposed power state using the power model, and wherein adjusting or maintaining a current power state of the computing device based on the power cap and the estimated power consumption further comprises changing the current power state to the proposed power state if the estimated power consumption is below the power cap, and otherwise remaining at the current power state.

9. A method comprising:
monitoring a power consumption of a computing device over a first time period, wherein the computing device is part of a cluster of computing devices;
monitoring values of a plurality of performance counters associated with an operating system executing at the computing device over the first time period;
generating a model of the power consumption of the computing device based on the monitored power consumption, the monitored values of the plurality of performance counters, and an application executed by the computing device, wherein the model takes, as an input, values of the plurality of performance counters and estimates a power consumption of the computing device using the values of the plurality of performance counters; and
receiving a power cap at the computing device, wherein the power cap is received from a power policy manager that is separate from the cluster of computing devices, and wherein the power cap is a fraction of a system-wide power cap that is associated with the computing devices in the cluster of computing devices.

10. The method of claim 9, wherein the model is one of a linear power model, a quadratic power model, a piecewise linear power model, a switching power model, or a non-linear power model, and further wherein the model is generated using least square fitting.

11. The method of claim 9, wherein the plurality of performance counters are a subset of a set of performance counters, and further comprising selecting the plurality of performance counters from the set of performance counters, wherein the plurality of performance counters are selected using one of regularization, step-wise searches, or hypothesis testing techniques.

12. The method of claim 9, further comprising monitoring values of the plurality of performance counters over a second time period, and estimating the power consumption of the computing device based on the monitored values of the plurality of performance counters over the second time period and the generated model.

13. The method of claim 12, further comprising adjusting or maintaining a current power state of the computing device based on the estimated power consumption and the power cap received at the computing device.

14. The method of claim 13, wherein the power cap comprises an upper bound and a lower bound, and adjusting or maintaining a current power state of the computing device based on the power model comprises:

determining if the estimated power consumption of the computing device is less than the upper bound and greater than the lower bound, and if so, maintaining the current power state of the computing device;

determining if the estimated power consumption of the computing device is greater than the upper bound, and if so, decreasing the current power state of the computing device to a lower power state; and determining if the estimated power consumption of the computing device is less than the lower bound, and if so, increasing the current power state of the computing device to a higher power state.

15. The method of claim 13, wherein adjusting or maintaining a current power state of the computing device based on the power cap and the estimated power consumption comprises:

determining a number of times that the power consumption is estimated to be greater than the power cap during the second period of time;

determining if the number of times is greater than a threshold; and decreasing the current power state of the computing device to a lower power state if the determined number of times is greater than the threshold.

16. The method of claim 13, wherein estimating a power consumption of the computing device using the power model further comprises estimating a power consumption of the computing device at a proposed power state using the power model, and wherein adjusting or maintaining a current power state of the computing device based on the power cap and the estimated power consumption further comprises changing the current power state to the proposed power state if the estimated power consumption is below the power cap, and otherwise remaining at the current power state.

17. A system comprising:

a plurality of computing devices; and a power policy manager adapted to determine a power cap and a power model for each of the plurality of computing devices based on a system-wide power cap associated with the plurality of computing devices, wherein each determined power cap is a fraction of the system-wide power cap and each determined power cap is based on one or more tasks performed by the associated computing device, and further wherein each computing device is adapted to:

receive a power model from the power policy manager, wherein the computing device is operating in a current power state;

receive a power cap from the power policy manager;

estimate a power consumption of the computing device at a proposed power state using the power model; and maintain the computing device at the current power state or transition to the proposed power state based on the power cap and the estimated power consumption at the proposed power state.

18. The system of claim 17, wherein each computing device adapted to maintain the computing device at the current power state or transition to the proposed power state based on the power cap and the estimated power consumption comprises the computing device adapted to:

determine if estimated power consumption at the proposed power state is greater than the power cap;

if it is determined that the estimated power consumption at the proposed power state is greater than the power cap, maintain the computing device at the current power state; and otherwise, transition to the proposed power state.

19. The system of claim 18, wherein each computing device adapted to estimate a power consumption of the computing device at a proposed power state using the power model comprises the computing device adapted to generate a plurality of estimates of the power consumption of the computing device at the proposed power state over a duration of time, and further wherein each computing device adapted to maintain the computing device at the current power state or transition to the proposed power state based on the power cap and the estimated power consumption comprises the computing device adapted to:

determine a number of times that an estimate of the plurality of estimates is greater than the power cap;

determine if the number of times is greater than a threshold;

if it is determined that the number of times is greater than the threshold, maintain the computing device at the current power state; and otherwise, transition to the proposed power state.

20. The system of claim 17, wherein the power policy manager is further adapted to provide different power caps to one or more of the plurality of computing devices based on one of performance objectives or compliance with a system-wide power cap.

* * * * *